No. 610,595. Patented Sept. 13, 1898.
L. R. WHITE.
HORSE POWER.
(Application filed Aug. 3, 1897.)
(No Model.)
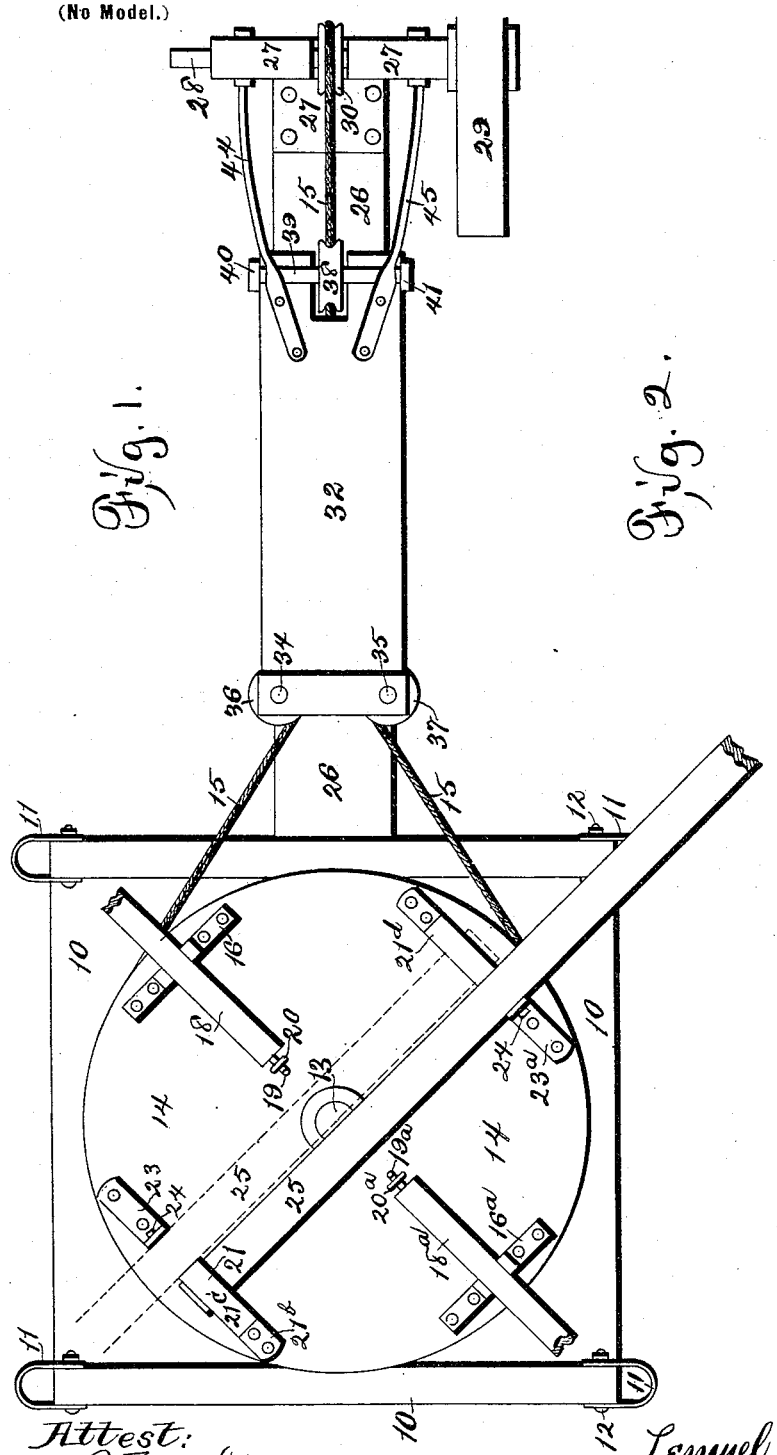
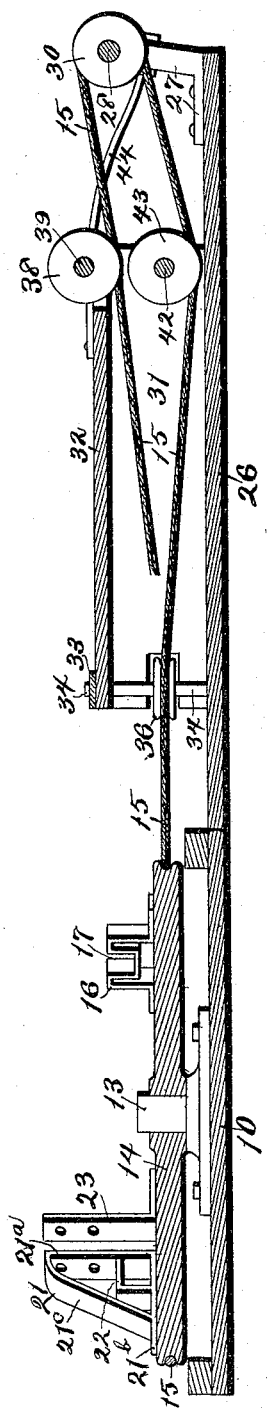

UNITED STATES PATENT OFFICE.

LEMUEL R. WHITE, OF HEBRON, IOWA.

HORSE-POWER.

SPECIFICATION forming part of Letters Patent No. 610,595, dated September 13, 1898.

Application filed August 3, 1897. Serial No. 647,002. (No model.)

*To all whom it may concern:*

Be it known that I, LEMUEL R. WHITE, a citizen of the United States of America, residing near Elmore, Minnesota, and in Hebron township, in the county of Kossuth and State of Iowa, have invented a new and useful Horse-Power, of which the following is a specification.

The object of this invention is to provide improved means for operating machinery through the medium of horse or other draft power traveling in an orbit continuously.

My invention consists of the new construction, arrangement, and combination of parts hereinafter fully described in detail, and particularly pointed out in the claim, reference being had to the accompanying drawings, in which like figures represent like parts in both views.
My invention consists, further, in the construction, arrangement, and combination of elements hereinafter set forth, pointed out in my claim, and illustrated by the accompanying drawings, in which—
Figure 1 is a plan of my machine, portions of the belt-wheel and draft-attaching devices being broken away. Fig. 2 is a sectional elevation centrally and longitudinally of the machine.
In the construction of the machine as shown the numeral 10 designates a platform which is provided with clevises 11 at each corner, through which clevises stakes may be driven into the ground to secure the platform in a given position and retaining same against rotation. The clevises 11 are pivoted to cross-beams of the platform by means of bolts 12.

Stepped on the central portion of the platform 10 by means of a vertically-positioned shaft 13 is a drum 14, which is provided with a grooved face. The drum 14 is circular in form and the groove in the face thereof is uniform around the periphery of the drum and of such depth as to receive a cable 15 of any desired size. A standard 16 is mounted on the upper face of the drum 14, near the periphery thereof, and is formed with a seat or depression 17 in its central portion to receive and retain by lateral movement a lever 18.
Fixed in the rear end of the lever 18 is a hook 19, arranged to engage at times in an eye-bolt or eye 20, mounted in the drum 14, near the center thereof. The lever 18 extends radially from the drum 14 a considerable distance and is employed as a stay to which to attach a lead-line of a horse or other draft-animal. A similar lever $18^a$ is mounted on the drum 14 in a similar manner diametrically opposite to the lever 18 and is employed to lead another draft-animal working conjunctively with the first said draft-animal, but on the opposite side of the drum therefrom. A bracket 21 is mounted on the drum 14 near the periphery thereof and approximately half-way between the brackets of the levers 18 $18^a$. The bracket 21 comprises a vertical portion $21^a$, a base portion $21^b$, and an oblique or brace rear portion $21^c$, connecting the upper end of the vertical portion and the outer end of the base portion, the inner end of the base portion and the lower end of the vertical portion being connected. A socket is formed in the bracket 21 by an angle-bar 22, connected at its ends to the vertical and base portions thereof and with them inclosing a rectangular space. A guide-bracket 23, having a vertical portion and a base portion at right angles thereto, is mounted on the drum in such a manner that the vertical portion thereof is parallel with and slightly removed from the vertical portion $21^a$ of the bracket 21. A bracket $21^d$, similar to the bracket 21, is mounted in opposition thereto, or, in other words, diametrically across the drum therefrom, and has a bracket $23^a$ positioned relative thereto, as the bracket 23 is positioned relative to the bracket 21. The vertical portions $21^a$ and the vertical portions of the brackets 23 are horizontally apertured to receive bolts 24, whereby levers 25 (one shown in dotted lines) are supported between the brackets and parallel with each other. The inner end portions of the levers 25 are inserted in the seats formed in the brackets 21 $21^d$ and are held in said seats by reason of their fastening by the bolts 24 to the opposite brackets.

The levers 25 25 are employed as means to which singletrees may be attached, the singletrees being also connected with the harness of the draft-animals held by attachment to the levers 18 $18^a$.

It will be observed that the levers 18 $18^a$ are inclined from the points of attachment to the eyes 20 upwardly, since the seats 17 of the brackets 16 are somewhat higher than the upper surface of the drum. It will be observed that the levers 25 25 are inclined from the seats in the brackets upwardly, for the reason that the bolts 24 are positioned at higher latitudes than the said seats.

A beam 26 is fixed to and extends outwardly from the platform 10, and a journal-bearing 27 is mounted on the outer end of said beam. A shaft 28 is mounted for rotation in the journal-bearing 27 and carries a belt-wheel 29 on one end thereof. The journal-bearing 27 is bifurcated, and a grooved wheel 30 is mounted rigidly on the shaft 28 within the bifurcation of said journal-bearing. A conduit is formed between the journal-bearing 27 and the platform 10 by uprightly-positioned planks 31, fixed to and rising from the beam 26, and a top plank 32, fixed to the upper edges of the planks 31. A tie-plate 33 is positioned transversely of the rear end of the top plank 32, and shafts 34 35 are vertically positioned and traverse the end portions of said tie-plate, the top plank, and the beam 26. The side planks 31 are notched at their rear ends, and guide-sheaves 36 37 are mounted for rotation on the shafts 34 35 within said notches. The top plank 32 is notched at its forward end, and a guide-sheave 38 is mounted in said notch and carried by and loosely on a shaft 39. The shaft 39 is mounted rigidly in the upper portions of sustaining-plates 40 41, which plates are fixed to the outer end portion of the conduit in vertical positions parallel with each other. A shaft 42 is mounted in the lower portions of the sustaining-plates 40 41, and a guiding-sheave 43 is mounted loosely on the central portion of said shaft in alinement with the guiding-sheave 38 and the grooved drive-wheel 30.

The outer end portions of the journal-bearing 27 are adjustably secured by tension-braces 44 45 to the outer end portion of the conduit.

The cable 15 may be made of wire rope or any suitable material of endless form and is run around the drum 14 and grooved drive-wheel 30, as shown, and is guided and directed in its travels by the sheaves 36, 37, 38, and 43.

It will be observed that the axis of rotation of the shaft 28 is at right angles to the axis of the drum and that the axes of the pairs of pulleys or sheaves at the forward and rear ends, respectively, of the conduit are at right angles to each other, and by the employment of the said sheaves provision is made for driving the shaft 28 in either direction simply by reversing the rotary movement of the drum. The rotary movement of the drum may be reversed by reversing the positions of the horses relative to the levers 25 25; but I would prefer to reverse the movement of the shaft 28 by reversing the cable on the grooved drive-wheel 30. When the horses are driven in an orbit around the platform 10, they step over the conduit through which the cable runs and in their travel rotate the drum 14 and cause a travel of the cable 15, which drives the shaft 28.

I claim as my invention—

A square platform, cross-bars along two opposite edges of said platform, clevises pivotally connected with the ends of said cross-bars, a shaft rising vertically from the center of said platform, a drum, having a grooved periphery, revolubly mounted on said shaft, brackets placed opposite each other on top of said drum near its periphery, each bracket provided with a socket to receive the end of a lever and with adjustable pins to secure another lever at the desired height, two levers extending side by side across said drum, each of said levers having one end in one of said sockets and secured by a pin to the opposite bracket, two levers secured on top of said drum and projecting radially from it on opposite sides between the first-mentioned levers, an arm rigidly connected with and extending from said platform on one side, said arm provided with a covered way for a portion of its length, a horizontal sheave mounted on a vertical shaft on each side the end of said covered way nearest said platform, vertical sheaves mounted on horizontal shafts one above the other at the farthest end of said covered way, a forked journal-bearing mounted on the outer end of said arm, a shaft, provided at its end with a pulley, mounted on said bearing, a driving-wheel mounted on said pulley-shaft in the fork of the bearing, braces from said bearing to the outer end of said covered way, an endless cable passing around said drum and the driving-wheel, guided by the horizontal and vertical sheaves, and means for operating the same, substantially as shown and described.

LEMUEL R. WHITE.

Witnesses:
W. E. OLINGER,
A. B. OLINGER.